(12) United States Patent
Chang et al.

(10) Patent No.: US 7,081,268 B2
(45) Date of Patent: Jul. 25, 2006

(54) IN-SITU POST-DEPOSITION OXIDATION TREATMENT FOR IMPROVED MAGNETIC RECORDING MEDIA

(75) Inventors: Chung-Hee Chang, Fremont, CA (US); Charles F. Brucker, Pleasanton, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 6 days.

(21) Appl. No.: 10/663,698

(22) Filed: Sep. 17, 2003

(65) Prior Publication Data

US 2004/0247940 A1 Dec. 9, 2004

Related U.S. Application Data

(60) Provisional application No. 60/475,834, filed on Jun. 3, 2003.

(51) Int. Cl.
*B05D 5/12* (2006.01)
(52) U.S. Cl. .................... 427/128; 427/130; 427/131
(58) Field of Classification Search ............. 427/128, 427/129, 131, 130
See application file for complete search history.

(56) References Cited

U.S. PATENT DOCUMENTS

| | | | |
|---|---|---|---|
| 4,511,594 A | 4/1985 | Yanai et al. | |
| 4,729,924 A | 3/1988 | Skorjanec et al. | |
| 4,741,967 A | 5/1988 | Yoshihara et al. | |
| 5,062,938 A | 11/1991 | Howard | |
| 5,080,971 A | 1/1992 | Yokoyama et al. | |
| 5,094,898 A * | 3/1992 | Morita et al. | 428/836.2 |
| 5,104,685 A | 4/1992 | Takahashi et al. | |
| 5,677,051 A * | 10/1997 | Ueda et al. | 428/336 |
| 5,731,068 A * | 3/1998 | Mizunoya et al. | 428/212 |
| 5,914,180 A | 6/1999 | Ito et al. | |
| 5,925,404 A * | 7/1999 | Chiba et al. | 427/128 |
| 6,153,063 A * | 11/2000 | Yamada et al. | 204/192.22 |
| 6,242,086 B1 | 6/2001 | Song et al. | |
| 6,524,724 B1 | 2/2003 | Cheng et al. | |
| 6,753,077 B1 * | 6/2004 | Nakata et al. | 428/831.2 |
| 6,821,618 B1 * | 11/2004 | Koujima et al. | 428/831.2 |
| 2001/0031383 A1 | 10/2001 | Sakawaki et al. | |
| 2002/0094458 A1 * | 7/2002 | Nakata et al. | 428/694 TS |
| 2002/0160232 A1 | 10/2002 | Shimizu et al. | |
| 2003/0059648 A1 | 3/2003 | Akimoto et al. | |

OTHER PUBLICATIONS

Toshiaki Keitoku, et al., Preparation of Co-Cr-Pt Alloy Film With High Perpendicular Coercivity And Large Negative Nucleation Field, Journal of Magnetism and Magnetic Materials 235 (2001) pp. 34-39.
Takashi Hikosaka, et al, Oxygen Effect On The Microstructure And Magnetic Properties of Binary CoPt Thin Films for Perpendicular Recording, IEEE Transactions On Magnetics, vol. 30, No. 6, Nov. (1994), pp. 4026-4028.
R.H. Victora, et al., Superlattice Magnetic Recording Media: Experiment and Simulation, Journal of Magnetism and Magnetic Materials 235 (2001) pp. 301-311.
Masaru Uchida, et al., Preparation of Fe-Pt Perpendicular Double-Layered Media With High Electric Resistivity Backlayer, Journal of Magnetism and Magnetic Materials 235 (2001) pp. 143-147.

* cited by examiner

*Primary Examiner*—Bret Chen
(74) *Attorney, Agent, or Firm*—McDermott Will & Emery LLP

(57) ABSTRACT

A method of manufacturing a magnetic recording medium comprises sequential steps of:
 (a) providing an apparatus for manufacturing the medium;
 (b) supplying the apparatus with a substrate for the medium;
 (c) forming a magnetic recording layer on the substrate in a first portion of the apparatus;
 (d) treating the magnetic recording layer with oxygen gas in a second portion of the apparatus at a sub-atmospheric pressure and for an interval sufficient to provide the resultant medium with at least one of the following, relative to a similar medium manufactured by a similar method but wherein the oxygen treatment of step (d) is not performed:
  (i) a more negative nucleation field ($H_n$);
  (ii) increased remanent squareness ($S_r$);
  (iii) increased signal-to-medium noise ratio (SMNR);
  (iv) narrower switching field distribution (SFD); and
  (v) decreased thermal decay rate; and
 (e) forming a protective overcoat layer on the oxygen-treated magnetic recording layer in a third portion of the apparatus.

15 Claims, 9 Drawing Sheets

IN-SITU POST-DEPOSITION OXIDATION TREATMENT FOR IMPROVED MAGNETIC RECORDING MEDIA

CROSS-REFERENCE TO PROVISIONAL APPLICATION

This application claims priority from U.S. provisional patent application Ser. No. 60/475,834 filed Jun. 3, 2003, the entire disclosure of which is incorporated herein by reference.

FIELD OF THE INVENTION

The present invention relates to a method for improving the performance characteristics of high areal recording density magnetic media, and to improved media obtained thereby which exhibit increased negative nucleation fields, remanent squareness, and signal-to-medium noise ratios, decreased thermal decay rate, and narrower switching field distribution ("SFD"). The invention is of particular utility in the manufacture of high areal recording density perpendicular magnetic media in the form of hard disks.

BACKGROUND OF THE INVENTION

Magnetic media are widely used in various applications, particularly in the computer industry, and efforts are continually made with the aim of increasing the areal recording density, i.e., bit density of the magnetic media. In this regard, so-called "perpendicular" recording media have been found to be superior to the more conventional "longitudinal" media in achieving very high bit densities. In perpendicular magnetic recording media, residual magnetization is formed in a direction perpendicular to the surface of the magnetic medium, typically a layer of a magnetic material on a suitable substrate. Very high linear recording densities are obtainable by utilizing a "single-pole" magnetic transducer or "head" with such perpendicular magnetic media.

Efficient, high bit density recording utilizing a perpendicular magnetic medium requires interposition of a relatively thick (as compared with the magnetic recording layer), magnetically "soft" underlayer ("SUL") layer, i.e., a magnetic layer having a relatively low coercivity of about 1 kOe or below, such as of a NiFe alloy (Permalloy), between the non-magnetic substrate, e.g., of glass, aluminum (Al) or an Al-based alloy, and the magnetically "hard" recording layer having relatively high coercivity of several kOe, typically about 3–6 kOe, e.g., of a cobalt-based alloy (e.g., a Co—Cr alloy such as CoCrPtB) having perpendicular anisotropy. The magnetically soft underlayer serves to guide magnetic flux emanating from the head through the hard, perpendicular magnetic recording layer.

A typical conventional perpendicular recording system 10 utilizing a vertically oriented magnetic medium 1 with a relatively thick soft magnetic underlayer, a relatively thin hard magnetic recording layer, and a single-pole head, is illustrated in FIG. 1, wherein reference numerals 2, 2A, 3, 4, and 5, respectively, indicate a non-magnetic substrate, an adhesion layer (optional), a soft magnetic underlayer, at least one non-magnetic interlayer, and at least one perpendicular hard magnetic recording layer. Reference numerals 7 and 8, respectively, indicate the single and auxiliary poles of a single-pole magnetic transducer head 6. The relatively thin interlayer 4 (also referred to as an "intermediate" layer), comprised of one or more layers of non-magnetic materials, serves to (1) prevent magnetic interaction between the soft underlayer 3 and the at least one hard recording layer 5 and (2) promote desired microstructural and magnetic properties of the at least one hard recording layer.

As shown by the arrows in the figure indicating the path of the magnetic flux $\phi$, flux $\phi$ is seen as emanating from single pole 7 of single-pole magnetic transducer head 6, entering and passing through the at least one vertically oriented, hard magnetic recording layer 5 in the region above single pole 7, entering and travelling along soft magnetic underlayer 3 for a distance, and then exiting therefrom and passing through the at least one perpendicular hard magnetic recording layer 5 in the region above auxiliary pole 8 of single-pole magnetic transducer head 6. The direction of movement of perpendicular magnetic medium 1 past transducer head 6 is indicated in the figure by the arrow above medium 1.

With continued reference to FIG. 1, vertical lines 9 indicate grain boundaries of polycrystalline layers 4 and 5 of the layer stack constituting medium 1. Since magnetically hard main recording layer 5 is epitaxially formed on interlayer 4, the grains of each polycrystalline layer are of substantially the same width (as measured in a horizontal direction) and in vertical registry (i.e., vertically "correlated" or aligned). Completing the layer stack is a protective overcoat layer 11, such as of a diamond-like carbon (DLC), formed over hard magnetic layer 5, and a lubricant topcoat layer 12, such as of a perfluoropolyethylene material, formed over the protective overcoat layer.

Substrate 2 is typically disk-shaped and comprised of a non-magnetic metal or alloy, e.g., Al or an Al-based alloy, such as Al—Mg having an Ni—P plating layer on the deposition surface thereof, or substrate 2 is comprised of a suitable glass, ceramic, glass-ceramic, polymeric material, or a composite or laminate of these materials; optional adhesion layer 2A, if present, may comprise an up to about 30 Å thick layer of a material such as Ti or a Ti alloy; soft magnetic underlayer 3 is typically comprised of an about 500 to about 4,000 Å thick layer of a soft magnetic material selected from the group consisting of Ni, NiFe (Permalloy), Co, CoZr, CoZrCr, CoZrNb, CoFeZrNb, CoFe, Fe, FeN, FeSiAl, FeSiAlN, FeCoB, FeCoC, etc.; interlayer 4 typically comprises an up to about 300 Å thick layer or layers of non-magnetic material(s), such as Ru, TiCr, Ru/CoCr$_{37}$Pt$_6$, RuCr/CoCrPt, etc.; and the at least one hard magnetic layer 5 is typically comprised of an about 100 to about 250 Å thick layer(s) of Co-based alloy(s) including one or more elements selected from the group consisting of Cr, Fe, Ta, Ni, Mo, Pt, V, Nb, Ge, B, and Pd, iron nitrides or oxides, or a (CoX/Pd or Pt)$_n$, multilayer magnetic superlattice structure, where n is an integer from about 10 to about 25, each of the alternating, thin layers of Co-based magnetic alloy is from about 2 to about 3.5 Å thick, X is an element selected from the group consisting of Cr, Ta, B, Mo, Pt, W, and Fe, and each of the alternating thin, non-magnetic layers of Pd or Pt is up to about 10 Å thick. Each type of hard magnetic recording layer material has perpendicular anisotropy arising from magneto-crystalline anisotropy ($1^{st}$ type) and/or interfacial anisotropy ($2^{nd}$ type).

Another way of classifying perpendicular magnetic recording media into different types is based on the media properties provided by the material(s) utilized for the magnetically hard recording layer(s) 5. For example, as indicated above, the at least one magnetically hard, perpendicular recording layer 5 can comprise magnetic alloys which are typically employed in longitudinal media, e.g., CoCr alloys, or multi-layer magnetic superlattice structures, such as the aforementioned (CoX/Pd or Pt)$_n$, superlattice structures.

Referring to FIG. 2 (A), graphically shown therein is an idealized representation of a Kerr hysteresis loop of a perpendicular magnetic recording medium, wherein the nucleation field ($H_n$), coercivity ($H_c$), and saturation field ($H_{sat}$) are defined. $H_n$ is defined as negative (−) when located in the second (i.e., upper left) quadrant of the graph and as positive (+) when located in the first (i.e., upper right) quadrant. Representative M-H hysteresis loops of magnetic recording layers comprised of these different types of materials are shown in FIGS. 2 (B)–2(C).

As is evident from FIG. 2 (B) showing the M-H loop of a perpendicular recording medium comprising a CoCr alloy, such type media typically exhibit a relatively low coercivity, low remanent squareness, i.e., less than 1, and a positive nucleation field $H_n$. In addition, the occurrence of magnetic domain reversal within bits, caused by the presence of high demagnetization fields in CoCr-based perpendicular recording media, is problematic with such media in that the phenomenon is a significant source of media noise reducing the SMNR. A high remanent squareness and a negative nucleation field $H_n$ are required in order to obtain good bit stability.

By contrast, and as evidenced by FIG. 2 (C) showing the M-H loop of a perpendicular recording medium comprising a $(CoX/Pd)_n$, multilayer magnetic superlattice structure, such type media advantageously exhibit a relatively high coercivity, remanent squareness of about 1, and a negative nucleation field $H_n$, which characteristics are attributed to the high anisotropy energy of such type media arising from interfacial anisotropy effects. However, the grains of the multilayer magnetic superlattice structure tend to experience exchange coupling leading to transition noise. Moreover, notwithstanding the possibility of further improvements in multilayer magnetic superlattice structures for use in the fabrication of high recording density magnetic media, significant current issues/problems remain pertaining to the ability to manufacture such structures in a commercially viable manner.

It is believed that high areal recording densities of about 200 Gbit/in$^2$ or greater are possible with perpendicular magnetic media utilizing CoCr-based magnetic alloys as the magnetically hard recording layer. However, the obtainment of such high areal recording densities requires CoCr-based perpendicular media which exhibit the advantageous properties associated with multilayer magnetic superlattice-based media, i.e., high coercivity, remanent squareness of about 1, and a negative nucleation field $H_n$.

In general, ultra-high areal density perpendicular magnetic recording media require perpendicular magnetic recording layers with high perpendicular anisotropy ($K_u$) and correspondingly high values of coercivity ($H_c$) and nucleation field ($H_n$), which high values are necessary for providing the media with resistance to the large demagnetization effects from the perpendicular recording geometry/system, for maintaining thermal stability with the very small grain sizes (volumes) required for ultra-high areal density recording, and to avoid erasure of the magnetization pattern by the auxiliary pole 8 of the single-pole transducer head 6.

A significant noise source in Co-alloy based perpendicular magnetic recording media is reversed magnetic domains within bits, which reversal is caused by high demagnetization fields within the co-based alloy. As a consequence, high remanent squareness ("$S_r$") and, as explained above, a negative nucleation field ($H_n$) are required for obtaining good bit stability. The higher values of perpendicular anisotropy ($K_u$) necessary for obtaining good thermal stability are traditionally obtained by increasing the Pt content of the bulk Co-based magnetic alloy. However, such increase in the Pt content disadvantageously decreases the amount of key segregating elements that can be included in the bulk Co-based alloy and degrades the signal-to-media noise ratio (SMNR) of the media.

In view of the above, there exists a clear need for an improved high areal recording density, magnetic information/data recording, storage, and retrieval media, e.g., perpendicular media, including Co alloy-based magnetically hard recording layers which exhibit substantially increased signal-to-media noise ratios (SMNR), high coercivity, remanent squareness of about 1, and a negative nucleation field $H_n$. In addition, there exists a need for an improved method for manufacturing high areal recording density, magnetic recording media, e.g., perpendicular media, employing Co alloy-based magnetically hard recording layers, which media exhibit substantially increased signal-to-media noise ratio (SMNR), high coercivity ($H_c$), remanent squareness ($S_r$) of about 1, a negative nucleation field ($H_n$), a narrow switching field distribution (SFD), and can be readily and economically fabricated by means of conventional continuous manufacturing techniques and instrumentalities.

The present invention addresses and solves problems attendant upon the use of Co alloy-based magnetically hard recording layers in the manufacture of high bit density magnetic media such as perpendicular media, which problems include, inter alia, noise generation which adversely affects the SMNR of the media, while maintaining all structural and mechanical aspects of high bit density recording technology. Moreover, the magnetic media of the present invention can be fabricated by means of conventional manufacturing techniques, e.g., sputtering.

DISCLOSURE OF THE INVENTION

An advantage of the present invention is an improved method for manufacturing a magnetic recording medium.

Another advantage of the present invention is improved perpendicular magnetic recording media manufactured by the improved method of the invention.

Yet another advantage of the present invention is an improved disk drive comprising an improved perpendicular magnetic recording medium manufactured by the improved method of the invention.

Still another advantage of the present invention is an improved method of manufacturing magnetic recording media according to a continuous process.

Additional advantages and other features of the present invention will be set forth in the description which follows and in part will become apparent to those having ordinary skill in the art upon examination of the following or may be learned from the practice of the present invention. The advantages of the present invention may be realized and obtained as particularly pointed out in the appended claims.

According to an aspect of the present invention, the foregoing and other advantages are obtained in part by a method of manufacturing a magnetic recording medium, comprising sequential steps of:

(a) providing an apparatus for manufacturing the medium;

(b) supplying said apparatus with a substrate for the medium;

(c) forming a magnetic recording layer on the substrate in a first portion of the apparatus;

(d) treating the magnetic recording layer with oxygen gas in a second portion of the apparatus at a sub-atmospheric pressure and for an interval sufficient to provide the resultant medium with at least one of the following, relative to a similar medium manufactured by a similar method but wherein the oxygen treatment of step (d) is not performed:

(i) a more negative nucleation field ($H_n$);
(ii) increased remanent squareness ($S_r$);
(iii) increased signal-to-medium noise ratio (SMNR);
(iv) narrower switching field distribution (SFD); and
(v) decreased thermal decay rate; and (e) forming a protective overcoat layer on the oxygen-treated magnetic recording layer in a third portion of the apparatus.

According to embodiments of the present invention, step (a) comprises providing an apparatus including at least said first, second, and third spaced-apart portions; the apparatus is adapted for continuous manufacture of a plurality of media and includes means for transporting the substrate serially through the first, second, and third spaced-apart portions; the first, second, and third spaced-apart, serially arranged portions of the apparatus respectively comprise first, second, and third spaced-apart chambers and at least the second chamber is adapted for providing a sub-atmospheric pressure therein; the second chamber comprises means for flowing a mixture of oxygen gas diluted with an inert carrier gas past a surface of the magnetic recording layer formed on the substrate in step (c); and the first and third chambers of the apparatus are adapted for performing a thin film deposition process therein, e.g., at least the first chamber of the apparatus is adapted for performing a sputtering process therein.

Preferred embodiments of the invention include those wherein step (c) comprises forming a magnetic recording layer selected from the group consisting of: (1) a Co-based alloy, Cr-rich (i.e., Cr-segregated) grain boundary type magnetic layer; (2) a granular-type magnetic layer; (3) a superlattice-type layer; and (4) an $L1_0$ ferromagnetic metal alloy-type layer.

According to a particular embodiment of the invention, step (c) comprises forming a Co-based alloy, Cr-rich (i.e., Cr-segregated) grain boundary-type magnetic recording layer comprised of a CoCrPtX alloy, where X=at least one element selected from the group consisting of Ta, B, Mo, V, Nb, W, Zr, Re, Ru, Cu, Ag, Hf, Ir, and Y, wherein Co-containing grains with hcp lattice structure are segregated by Cr-rich grain boundaries; step (d) comprises treating the magnetic recording layer with a gas mixture comprising up to about 20% oxygen gas in at least one inert diluent gas, at a total gas pressure up to about 50 mTorr, and for an interval up to about 10 sec.; and step (c) further comprises use of a heated substrate during formation of the magnetic recording layer to effect segregation of Cr in the grain boundaries.

In accordance with another particular embodiment of the present invention, step (c) comprises forming a granular-type magnetic recording layer comprised of a CoPtX alloy, where X=at least one material selected from the group consisting of Cr, Ta, B, Mo, V, Nb, W, Zr, Re, Ru, Cu, Ag, Hf, Ir, Y, $SiO_2$, SiO, $Si_3N_4$, $Al_2O_3$, AlN, TiO, $TiO_2$, $TiO_x$, TiN, TiC, $Ta_2O_3$, NiO, and CoO, and wherein Co-containing grains with hcp lattice structure are segregated by oxide, nitride, or carbide grain boundaries; step (d) comprises treating the magnetic recording layer with a gas mixture comprising up to about 20% oxygen gas in at least one inert diluent gas, at a total gas pressure up to about 50 mTorr, and for an interval up to about 10 sec.; and step (d) comprises treating the magnetic recording layer with oxygen gas without applying heat thereto.

According to still another particular embodiment of the present invention, step (c) comprises forming a superlattice-type magnetic recording layer comprising a multi-layer $(CoX/Pd)_n$ or $(CoX/Pt)_n$ structure, where n is an integer from about 10 to about 25 and X is an element selected from the group consisting of Cr, Ta, B, Mo, Pt. W, and Fe; and step (d) comprises treating the magnetic recording layer with oxygen gas without applying heat thereto.

In accordance with yet another particular embodiment of the invention, step (c) comprises forming an $L1_0$ ferromagnetic metal alloy-type layer comprising a FePt or CoPt alloy.

Additional preferred embodiments of the invention include those wherein step (b) comprises supplying the apparatus with a disk-shaped substrate for a hard disk magnetic recording medium; and wherein step (e) comprises forming a carbon-based protective overcoat layer on the oxygen-treated magnetic recording layer.

According to other aspects of the present invention, improved perpendicular magnetic recording media manufactured according to the above-described embodiments and disk drives comprising same are provided.

Still another aspect of the present invention is a method of manufacturing magnetic recording media according to a continuous process, comprising sequential steps of:

(a) providing at least one substrate for the magnetic recording media;

(b) providing an apparatus adapted for continuous manufacturing of the magnetic recording media, comprising at least first, second, and third spaced-apart, serially arranged processing chambers and including means for transporting the at least one substrate serially through at least the first, second, and third spaced-apart processing chambers;

(c) transporting the substrate through the first processing chamber while forming a magnetic recording layer thereon;

(d) transporting the substrate with the magnetic recording layer formed thereon to the second processing chamber;

(e) transporting the substrate through the second processing chamber while treating the magnetic recording layer with oxygen gas at a sub-atmospheric pressure and for an interval sufficient to provide the resultant media with at least one of the following, relative to similar media manufactured by a similar method but wherein the oxygen treatment of step (e) is not performed:

(i) a more negative nucleation field ($H_n$);
(ii) increased remanent squareness ($S_r$);
(iii) increased signal-to-medium noise ratio (SMNR);
(iv) narrower switching field distribution (SFD); and
(v) decreased thermal decay rate;

(f) transporting the substrate with the oxygen-treated magnetic recording layer formed thereon to the third processing chamber; and (g) transporting the substrate through the third processing chamber while forming a protective overcoat layer on the oxygen-treated magnetic recording layer; wherein:

the substrate is transported between and through each of the first, second, and third processing chambers at a substantially constant rate.

According to preferred embodiments of the present invention, step (a) comprises providing at least one disk-shaped substrate for hard disk magnetic recording media; step (b) comprises providing an apparatus wherein the first and third chambers are adapted for performing a thin film deposition process therein and at least the second chamber is adapted for providing a sub-atmospheric pressure therein; and step (c) comprises forming a magnetic recording layer selected from the group consisting of: (1) a Co-based alloy, Cr-rich (i.e., Cr-segregated) grain boundary-type magnetic layer; (2) a granular-type magnetic layer; (3) a superlattice-type layer; and (4) an $L1_0$ ferromagnetic metal alloy-type layer.

Additional advantages and aspects of the present invention will become readily apparent to those skilled in the art from the following detailed description, wherein embodiments of the present invention are shown and described, simply by way of illustration of the best mode contemplated for practicing the present invention. As will be described, the present invention is capable of other and different embodiments, and its several details are susceptible of modification in various obvious respects, all without departing from the spirit of the present invention. Accordingly, the drawings and description are to be regarded as illustrative in nature, and not as limitative.

BRIEF DESCRIPTION OF THE DRAWINGS

The following detailed description of the embodiments of the present invention can best be understood when read in conjunction with the following drawings, in which the various features are not necessarily drawn to scale but rather are drawn as to best illustrate the pertinent features, wherein:

FIGS. 2 (B) and 2 (C), respectively, are graphical representations of Kerr M-H hysteresis loops of perpendicular magnetic recording media exhibiting positive and negative nucleation fields ($H_n$);

DESCRIPTION OF THE INVENTION

Figure 1:
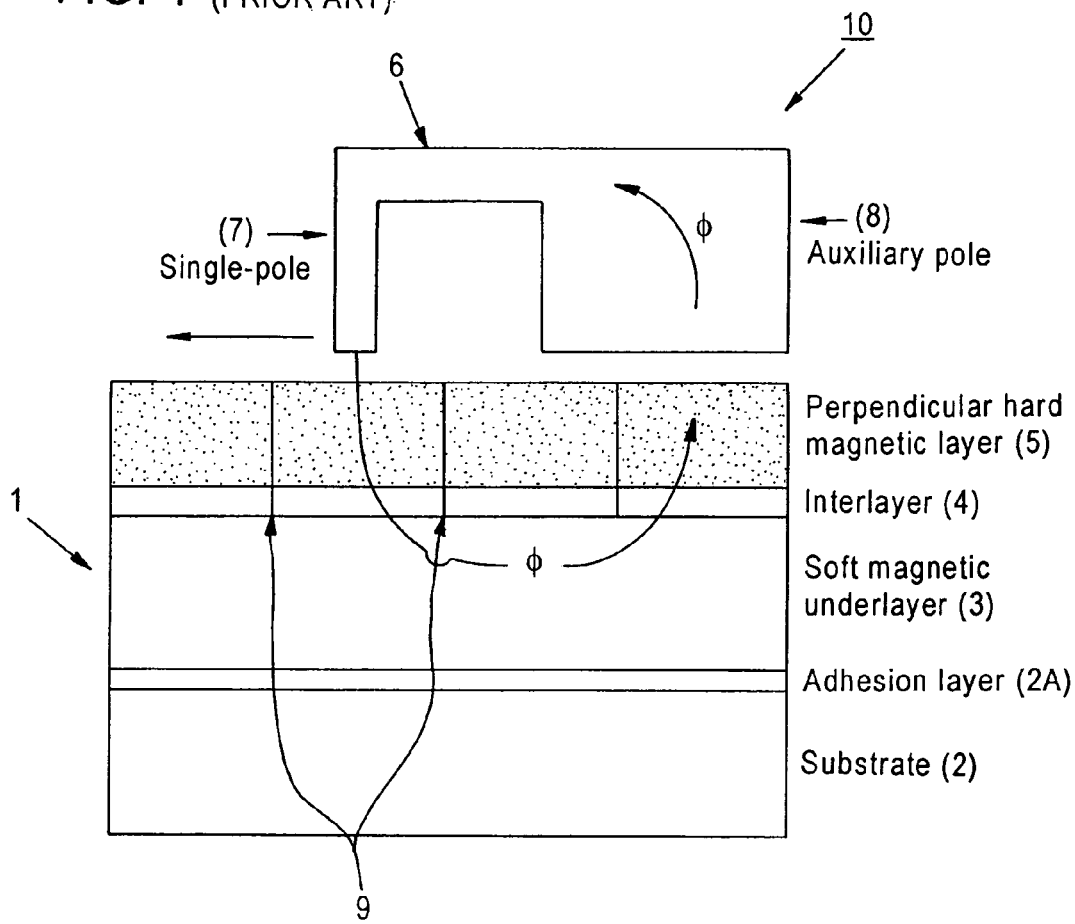
FIG. 1 schematically illustrates, in simplified, cross-sectional view, a portion of a magnetic recording, storage, and retrieval system comprised of a conventional perpendicular-type magnetic recording medium including a soft magnetic underlayer, and a single-pole transducer head.
Figure 2A:
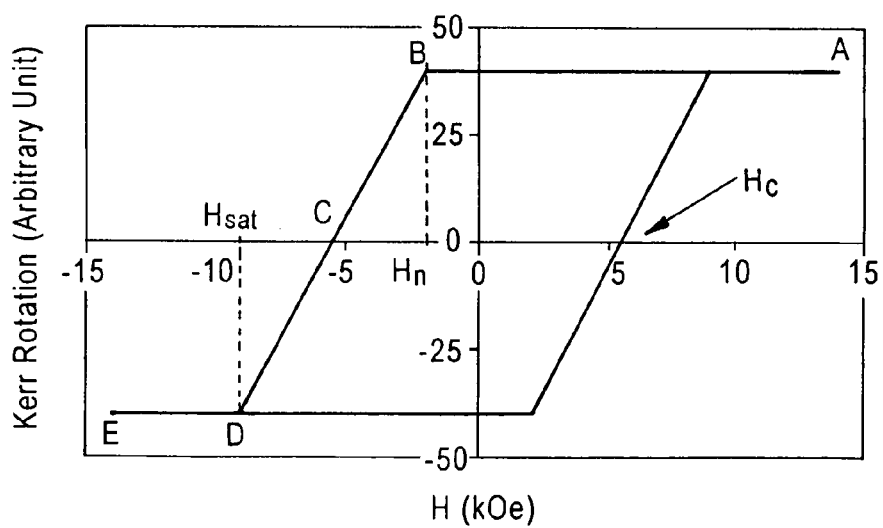
FIG. 2 (A) is an idealized graphical representation of a Kerr M-H hysteresis loop of a perpendicular magnetic recording medium.
Figure 2B:
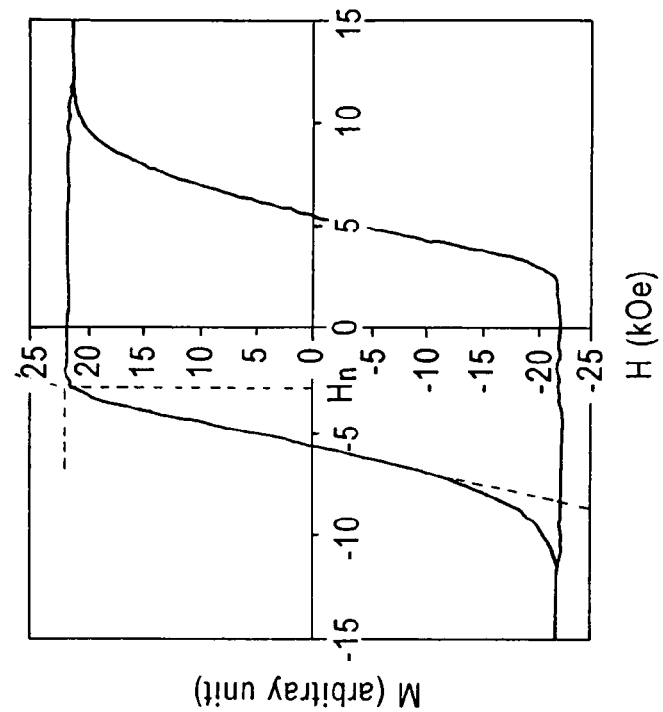
Figure 2C:
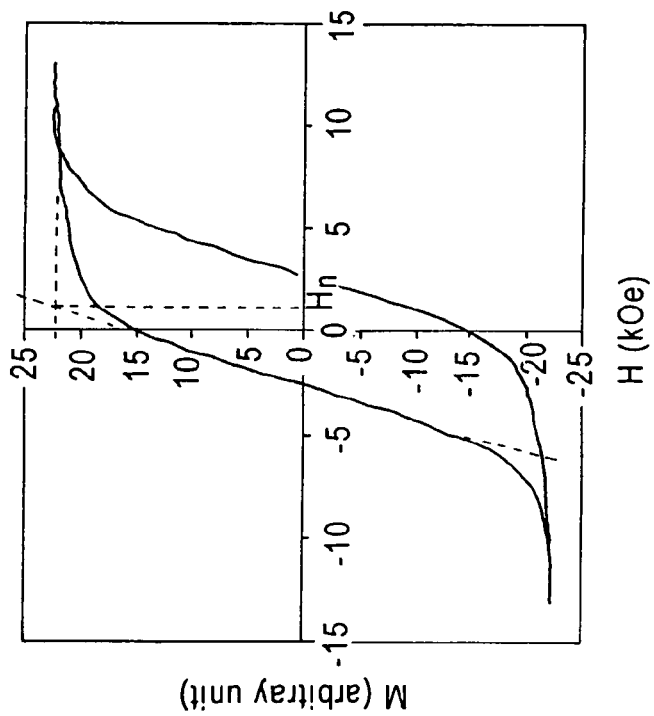

The present invention is based upon recognition by the inventors that high areal density magnetic recording media, such as perpendicular media, can be readily and reliably fabricated with significantly improved recording performance parameters by performing an in situ post-deposition treatment of the magnetic recording layer with oxygen gas, i.e., immediately subsequent to formation thereof and just prior to formation of a protective overcoat layer thereon. Specifically, the in situ post-deposition oxygen treatment of the magnetic recording layer provided by the present invention affords a number of improvements in media performance, relative to similar media prepared without the inventive oxygen post-treatment of the magnetic recording layer, including at least one of: a more negative nucleation field ($H_n$); an increased remanent squareness ($S_r$); an increased signal-to-medium noise ratio (SMNR); a narrower switching field distribution (SFD); and a decreased thermal decay rate.

According to advantageous features of the invention, the in situ post-deposition treatment of the magnetic recording layer with oxygen gas is performed at a sub-atmospheric pressure with a low concentration of oxygen gas carried in an inert diluent gas, and in a dedicated space or chamber located intermediate a pair of spaces or chambers respectively dedicated for formation of the magnetic recording and protective overcoat layers. According to further advantageous features of the instant invention, the in situ post-deposition treatment of the magnetic recording layer with oxygen gas is performed rapidly, at rates consistent with, thus facilitating use of, continuously operated apparatus utilized for high product throughput, cost-effective, automated manufacture of magnetic recording media, e.g., in-line, multi-chamber sputtering apparatus.

As indicated supra, high areal recording density magnetic media, e.g., perpendicular media, require magnetic recording layers exhibiting high perpendicular anisotropy ($K_u$) and correspondingly high coercivity ($H_c$) and nucleation field ($H_n$). The high values of $H_c$ and $H_n$ are necessary in order to resist the large demagnetization effects inherent in the design/geometry of the perpendicular recording media and systems, to maintain good thermal stability in face of the ever smaller grain volumes associated with such high areal recording density media, and to avoid bit erasure by the auxiliary magnetic pole of the read/write transducer head. In addition, reversal of magnetic domains within bits, caused by the high demagnetization fields in Co alloy-based (segregation-type) perpendicular media have been determined to be a significant source of media noise. High remanent squareness ($S_r$) and a negative nucleation field ($H_n$) are required for maintaining good bit stability. On the other hand, the higher values of perpendicular anisotropy ($K_u$) required for thermal stability are traditionally obtained by increasing the Pt content of the bulk CoCrPt magnetic alloy. However, this approach disadvantageously decreases the amount of key segregating elements that can be included in the bulk alloy and therefore results in degradation of the signal-to-medium noise ratio (SMNR).

As a consequence of the above, a desirable goal is to enable formation of high areal density magnetic recording media, e.g., perpendicular media, with a sufficiently negative nucleation field ($H_n$) and remanent squareness ($S_r$) substantially equal to 1, without incurring degradation of the SMNR. An approach for meeting the above-mentioned goal, according to the present invention, is in situ post-deposition treatment of the just-deposited magnetic recording layer with oxygen gas, prior to formation of a protective overcoat layer thereon.

According to an advantageous feature of the instant invention, the in situ post-deposition treatment of the just-deposited magnetic recording layer with oxygen gas may form part of a continuous, high product throughput, automated manufacturing process for magnetic recording media utilizing conventional in-line or circularly arranged multi-chamber apparatus, e.g., sputtering apparatus. More specifically, according to the invention, the in situ post-deposition treatment of the just-deposited magnetic recording layer with oxygen gas may be performed by exposing the media substrate with the just-formed magnetic recording thereon to a flow or stream of a sub-atmospheric pressure gas comprised of a relatively small amount of oxygen gas in admixture with a relatively large amount of at least one inert diluent or carrier gas, e.g., argon and/or nitrogen, the treatment being performed in a dedicated process station located between a pair of process stations respectively dedicated for depositing the magnetic recording and protective overcoat layers on the media substrate. The in situ post-deposition treatment of the just-deposited magnetic recording layer with oxygen gas may be rapidly performed within the dedicated process station, at media substrate transport rates consistent with the substrate transport rates between and through the other process stations of the continuously operated apparatus.

According to the invention, the magnitude and direction of the changes in coercivity ($H_c$) and nucleation field ($H_n$) depend upon the design parameters of the media, e.g., magnetic alloy composition and thickness of the recording layer. The optimum amount of oxygen in the gas mixture utilized for the in situ post-deposition treatment also depends upon the manner by which the gas mixture is introduced and flowed through the dedicated process station and the efficiency of gas removal therefrom. The in situ post-deposition treatment with oxygen of the present invention can form part of the fabrication process of all types of magnetic recording media requiring magnetic recording layers with well-defined grains, e.g., segregated grains. Such recording layers include, inter alia, (1) Co-based alloy, Cr-rich (i.e., Cr-segregated) grain boundary type magnetic layers (e.g., traditional hcp-structured, CoCr based-alloy layers); (2) granular-type magnetic layers (i.e., where the grains are separated by oxides, nitrides, or carbides, e.g., reactively sputtered $CoO_x$ alloy-based layers); (3) a super-lattice-type layer (e.g., (Co/Pd or Pt)$_n$ multi-layers); and (4) $L1_0$ ferromagnetic metal alloy-type layers (e.g., FePt or CoPt alloy-based layers). Since a high sputtering pressure is required for forming more porous granular and multi-layer type magnetic recording layers, it is relatively easy for oxygen atoms supplied thereto during the in situ post-deposition treatment to migrate into the grain boundaries and effect better decoupling between adjacent grains than with the other enumerated types of magnetic recording layers. As a consequence, use of heated substrates during the in situ post-deposition treatment with oxygen gas is generally not required with the granular-type magnetic recording layers, whereas heated substrates may, if desired, be utilized during in situ post-deposition treatment of the other types of magnetic recording layers with oxygen gas.

The versatility of the present invention will now be demonstrated by reference to the following examples.

Perpendicular media with Co-based alloy, Cr-rich (Cr-segregated) grain boundary type magnetic recording layers—A multi-chamber, single-disk type sputtering apparatus was utilized for fabricating magnetic recording media comprising Co-based alloy, Cr-rich (Cr-segregated) grain boundary type magnetic recording layers, wherein the mixture of oxygen gas and inert carrier (or diluent) gas entered the dedicated in situ post-deposition treatment chamber via the top thereof and residual gas was withdrawn via the bottom.

As indicated above, such Co-based alloy, Cr-rich (i.e., Cr-segregated) grain boundary type magnetic recording layers typically comprise CoCrPtX alloys, where X is at least one element selected from Ta, B, Mo, V, Nb, W, Zr, Re, Ru, Ag, Hf, Ir, and Y, and wherein Co-containing grains with hcp lattice structure are segregated by Cr-rich grain boundaries.

The following media structures were formed: Substrate // adhesion layer // soft magnetic underlayer/interlayer(s) // recording layer(s) // protective overcoat layer wherein:

adhesion layer=Ti soft magnetic underlayer=FeCoB interlayer(s)=Ru/CoCrPt or $RuCr_{10}$/CoCrPt recording layer(s)=CoCrPtB/CoCrPt protective overcoat layer=carbon (C)-based The target compositions for the various sputtered layers were as follows:

interlayer: $CoCr_{37}Pt_6$ recording layer(s): $CoCr_{22}Pt_{19}B_1$ and $CoCr_{20}Pt_{17}$.

The Ti adhesion layer, Ru/CoCrPt or $RuCr_{10}$/CoCrPt interlayers, and the CoCrPtB and CoCrPt recording layers were sputtered in an Ar atmosphere at about 6 mTorr. The FeCoB soft magnetic underlayer was sputtered in an Ar atmosphere at about 2 MTorr. The substrate was heated between sputtering of the Ru or $RuCr_{10}$ and the CoCrPt interlayers to facilitate Cr segregation in the recording layer(s) subsequently formed thereover. The % content of oxygen ($O_2$) gas in the oxygen/Ar inert carrier or diluent gas mixture introduced into the dedicated in situ post-deposition treatment chamber positioned between the recording layer and protective overcoat deposition chambers was varied so as to expose disks transported therethrough to different amounts of oxygen. The flow of oxygen was controlled by a pair of Mass Flow Controllers (MFC), wherein the flow of pure Ar gas was controlled by MFC 1 and the flow of an $O_2$/Ar gas mixture was controlled by MFC 2. Finer adjustment of the $O_2$ content of the treatment gas was accomplished by attaching a lower $O_2$ content gas cylinder to MFC 2. The gas flows utilized for each data point in the graphs of the drawing figures are indicated in Table I, and the total gas pressure was less than about 20 mTorr, i.e., about 13 mTorr.

TABLE I

| % O$_2$ Content in O$_2$/Ar | 0 | 2 | 4 | 6 | 8 | 10 |
|---|---|---|---|---|---|---|
| MFC 1: 100% Ar (sccm) | 40 | 36 | 32 | 28 | 24 | 20 |
| MFC 2: 20% O$_2$ in Ar (sccm) | 0 | 4 | 8 | 12 | 16 | 20 |
| % O$_2$ Content in O$_2$/Ar | 0 | 0.1 | 0.2 | 0.3 | 0.4 | 0.5 |
| MFC 1: 100% Ar (sccm) | 40 | 36 | 32 | 28 | 24 | 20 |
| MFC 2: 1% O$_2$ in Ar (sccm) | 0 | 4 | 8 | 12 | 16 | 20 |
| % O$_2$ Content in O$_2$/Ar | 0 | 0.02 | 0.04 | 0.06 | 0.08 | 0.10 |
| MFC 1: 100% Ar (sccm) | 40 | 32 | 24 | 16 | 8 | 0 |
| MFC 2: 0.1% O$_2$ in Ar (sccm) | 0 | 8 | 16 | 24 | 32 | 40 |

Figure 3B:
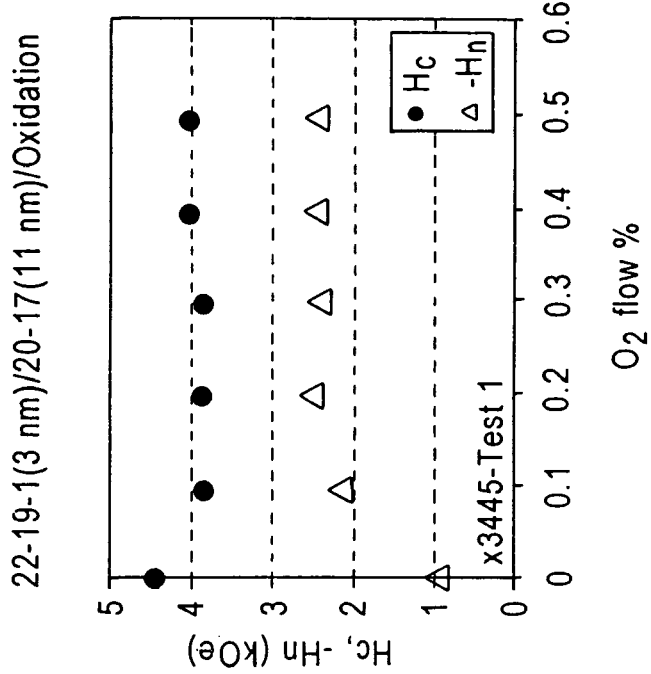
FIGS. 3 (A) and 3 (B) are graphs for illustrating the variation of coercivity ($H_c$) and nucleation field ($H_n$) of CoCrPt-based, Cr-rich (i.e., Cr-segregated) grain boundary type perpendicular magnetic recording media, fabricated in a sputtering apparatus, as a function of % oxygen content during in situ post-deposition oxidation treatment of the magnetic recording layer according to an embodiment of the present invention.
Figure 3A:
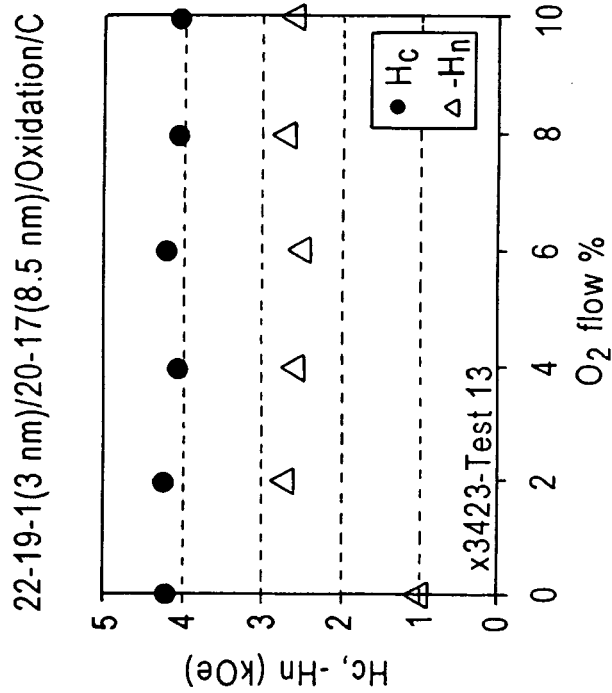
Figure 4:
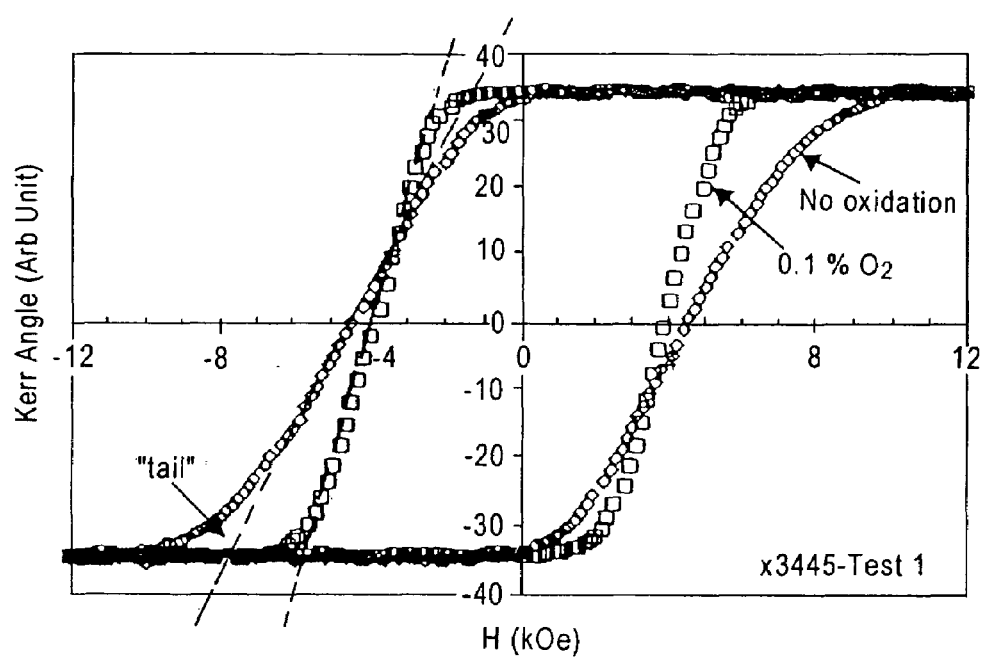
FIG. 4 is a graphical representation of the Kerr M-H hysteresis loops of samples of the perpendicular magnetic recording media of FIG. 3 (B)

When the O$_2$ content was increased from 0 to about 10%, the coercivity (H$_c$) and nucleation field (H$_n$) of media of layer structure: substrate // adhesion layer: Ti (3 nm) // soft magnetic underlayer: FeCoB (160 nm) // interlayer(s): Ru (2 nm)/CoCr$_{37}$Pt$_6$ (7.5 nm) // recording layer(s): CoCr$_{22}$Pt$_{19}$B$_1$, (3 nm)/CoCr$_{20}$Pt$_{17}$ (8.5 nm) varied, as graphically illustrated in FIG. 3 (A). As is apparent from the figure, the nucleation field (H$_n$) increases dramatically as the media is exposed to post treatment gases containing 2% or more O$_2$ in Ar, while the coercivity (H$_c$) is relatively unaffected. FIG. 3 (B) graphically illustrates the changes in H$_c$ and H$_n$ of similar media, but wherein the thickness of the CoCr$_{20}$Pt$_{17}$ recording layer is increased to 11 nm, and wherein finer control of the % O$_2$ content was provided (by the means described above). As is evident from FIG. 3 (B), when finer control/adjustement of the % O$_2$ content is provided, the critical % O$_2$ content that creates the greatest effect (i.e., change) in nucleation field (H$_n$) is seen to be much lower than that for the media illustrated in FIG. 3 (A), i.e., about 0.10–0.20% O$_2$, e.g., ~0.15% O$_2$. Kerr M-H hysteresis curves or loops for media samples with and without the in situ post-deposition treatment of the magnetic recording layer with oxygen gas at sub-atmospheric pressure are graphically shown in FIG. 4, from which it is apparent that the slope of the hysteresis curve or loop is increased, and H$_{sat}$ and the switching field distribution (SFD) are decreased in media subjected to the in situ post-deposition treatment of the magnetic recording layer.

Figure 5A:
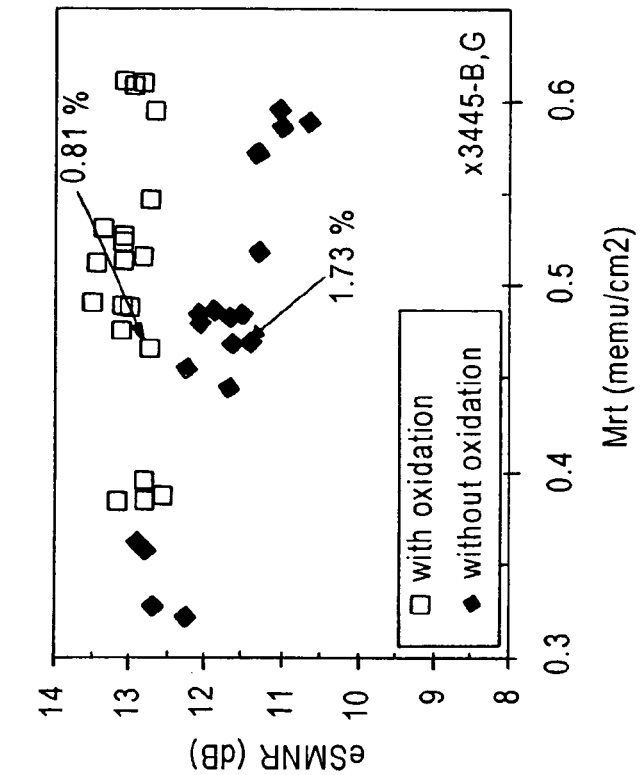
FIGS. 5 (A) and 5 (B) are graphs for illustrating the signal-to-media noise ratios (SMNR) and % thermal decay rates of CoCrPt-based, Cr-rich (i.e., Cr-segregated) grain boundary type perpendicular magnetic recording media fabricated with and without the in situ post-deposition oxidation treatment of the magnetic recording layer according to the present invention.
Figure 5B:
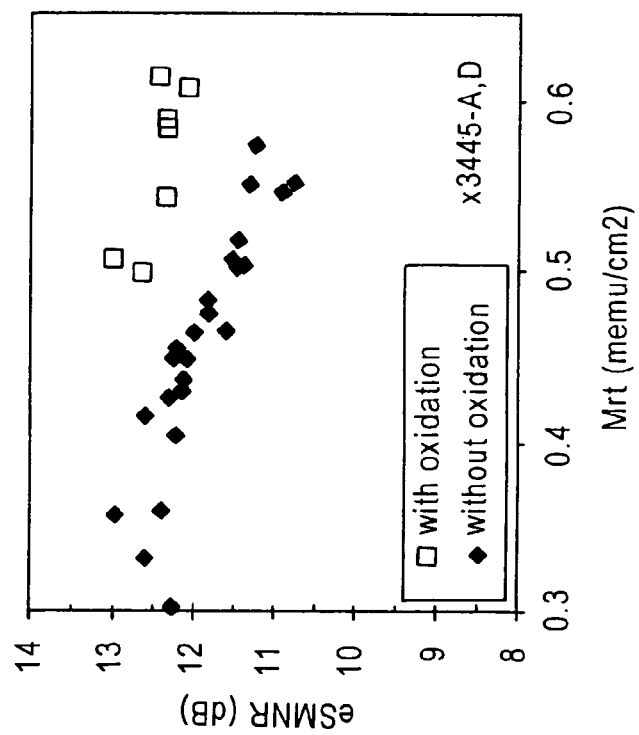

FIGS. 5 (A) and 5 (B), respectively, graphically illustrate signal-to-media noise (SNR=SMNR) data (and thermal decay rates) for dual- and single-recording layer media with the following structure: substrate/adhesion layer: Ti (3 nm)/ soft magnetic underlayer: FeCoB (200 nm)/ interlayer(s): Ru (2 nm)/CoCr$_{37}$Pt$_6$ (7.5 mm), with the dual-recording layer design comprised of a first, CoCr$_{22}$ Pt$_{19}$B$_1$ layer having a thickness of 1 nm or 3 nm and a second, CoCr$_{20}$Pt$_{17}$ layer having a thickness of 9.5 nm or 13.5 nm. The thickness of the CoCr$_{20}$Pt$_{17}$ layer of the single-recording layer media varied from 13–17 nm. The % O$_2$ content of the O$_2$/Ar gas mixture flowed past the surface of the magnetic recording layer(s) during the in situ post-deposition treatment was fixed at 0.05% and the treatment duration fixed at 3.5 sec. for all samples. The observed SNR is consistently greater for the samples subjected to the in situ post-deposition treatment. Thermal decay rates measured for 2 samples at 75° C. are shown in FIG. 5 (B) and indicate that the thermal decay rate for the sample subjected to the in situ post-deposition treatment (0.81%/decade) was lower than that of the sample not subjected to the in situ post-deposition treatment (1.73%/decade).

While the mechanism for the benefits afforded by the in situ post-deposition oxygen treatment of the magnetic recording layer of the instant invention is not clear, and not desirous of being bound by any particular theory, it is nonetheless observed that the increase in SMNR (or SNR) provided by the inventive post-treatment is correlated with the decrease in switching field distribution (SFD), and the oxygen post-treatment is believed to break up ill- or poorly-defined grains and magnetic clusters, thereby resulting in the narrower SFD.

Figure 6:
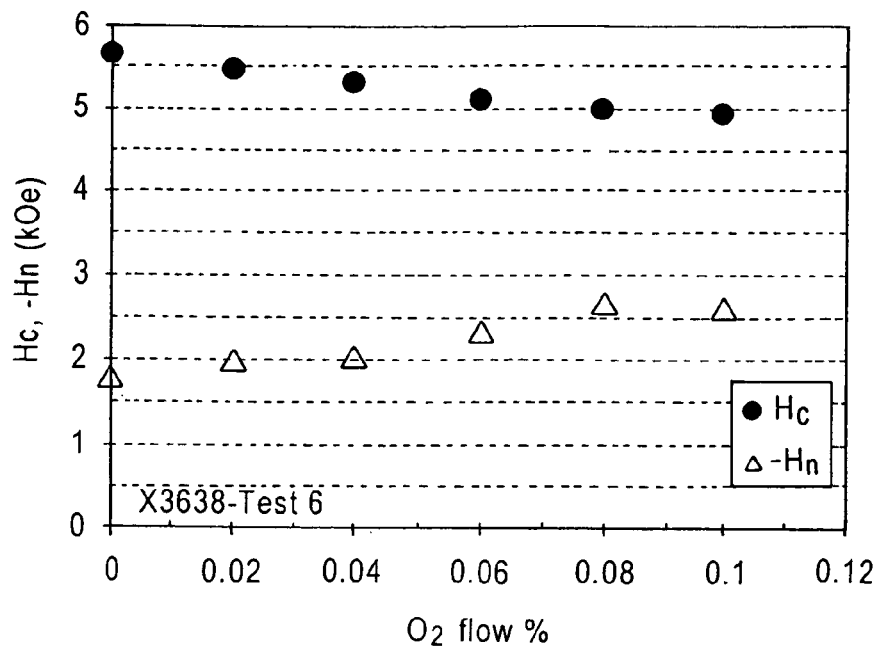
FIG. 6 is a graph for illustrating the variation of coercivity ($H_c$) and nucleation field ($H_n$) of CoCrPt-based, Cr-rich (i.e., Cr-segregated) grain boundary type perpendicular magnetic recording media as a function of very low % oxygen contents during in situ post-deposition oxidation treatment of the magnetic recording layer according to the present invention.
Figure 7:
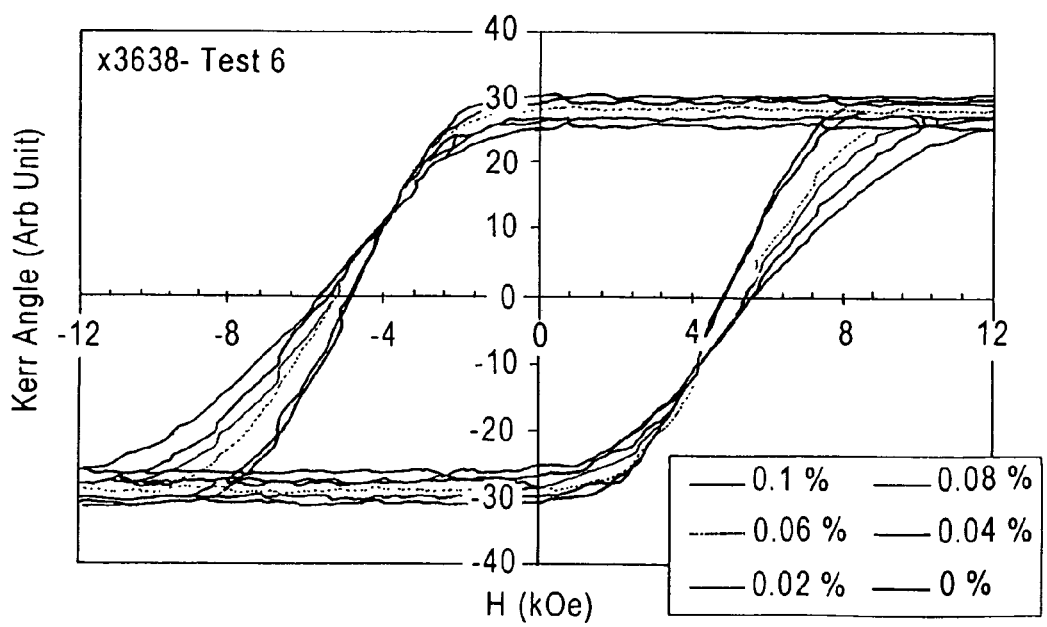
FIG. 7 is a graphical representation of the Kerr M-H hysteresis loops of samples of the perpendicular magnetic recording media of FIG. 6.

Extremely fine control of the magnetic properties of recording media subjected to the inventive in situ oxygen post-treatment is made possible by finer adjustment of the % O$_2$ content in the O$_2$/inert gas mixture using an O$_2$ source (e.g., gas cylinder) with a lower O$_2$ content. The variations of H$_c$ and H$_n$ as the % O$_2$ content varies from 0 to about 0.1% for media having a 15 nm thick CoCt$_{20}$Pt$_{17}$ recording layer are graphically shown in FIG. 6, and M-H hysteresis loops or curves for the same media samples are shown in FIG. 7. As is evident from the latter, the shape of the M-H hysteresis loops or curves changed monotonically as the % O$_2$ content increased from 0 to about 0.1%.

Figure 8:
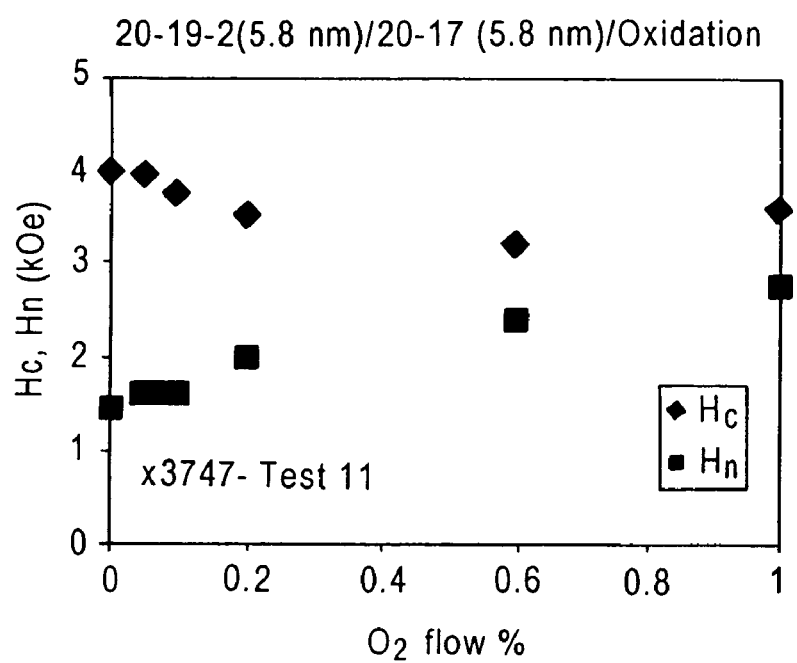
FIG. 8 is a graph for illustrating the variation of coercivity ($H_c$) and nucleation field ($H_n$) of CoCrPt-based, Cr-rich (i.e., Cr-segregated) grain boundary type perpendicular magnetic recording media, fabricated in a different sputtering apparatus, as a function of % oxygen content during in situ post-deposition oxidation treatment of the magnetic recording layer according to another embodiment of the present invention.

Although the precise % O$_2$ content necessary for effecting desired changes in the magnetic properties of the media depends upon the composition and thickness of the magnetic recording layer, the changes are more dependent upon the design of the media fabrication tool, e.g., the design of the chamber utilized for performing the in situ post-deposition oxygen treatment. An example of such dependence upon design of the post-treatment chamber is shown in FIG. 8, wherein the variations in H$_c$, and H$_n$ as a function of % O$_2$ content in the O$_2$/inert carrier gas mixture are graphically presented. In this instance, both introduction and withdrawal of the gas mixture occurred via the bottom of the post-treatment chamber. An increase in H$_n$ was again observed when the % O$_2$ content was at least about 0.2%.

When the depth profiles of media samples utilized for developing the graphs of FIGS. 3 (A) and 3 (B) were analyzed by Time-of-Flight/Secondary Ion Mass Spectroscopy (TOF/SIMS), the presence of chromium and cobalt oxides (CrO$_x$ and CoO$_x$) was detected between the carbon (C)-based protective overcoat layers and the recording layers when the % O$_2$ content of the O$_2$/inert carrier gas mixture was greater than about 0.1%. The amount of such chromium and cobalt oxides formed when the % O$_2$ content was less than about 0.1% was below the detection limit of the TOF/SIMS technique. Therefore, depending upon the design of the media and the fabrication tool (e.g., post-treatment chamber), and selection of the analysis technique, oxide species formed as a result of the inventive in situ post-deposition oxygen treatment may not be detectable.

Perpendicular media with granular-type magnetic recording layers—A multi-chamber, single-disk type sputtering apparatus was utilized for fabricating perpendicular-type magnetic recording media comprising granular-type magnetic recording layers, wherein the O$_2$/inert carrier (diluent) gas mixture entered the dedicated in situ post-deposition treatment chamber via the top thereof and residual gas was withdrawn via the bottom.

As indicated above, such granular-type magnetic recording layers typically comprise a CoPtX alloy, where X=at least one material selected from the group consisting of Cr, Ta, B, Mo, V, Nb, W, Zr, Re, Ru, Cu, Ag, Hf, Ir, Y, SiO$_2$, SiO, Si$_3$N$_4$, Al$_2$O$_3$, AlN, TiO, TiO$_2$, TiO$_x$, TiN, TiC, Ta$_2$O$_3$, NiO, and CoO, and wherein Co-containing grains with hcp lattice structure are segregated by oxide, nitride, or carbide grain boundaries.

The following media structures were formed: Substrate // adhesion layer: Ti // soft magnetic underlayer(s): FeCoB (50 nm)/Ta (2.5 nm)/FeCoB (50 nm) // interlayer(s): Ag (1.5 nm)/Ru or $RuCr_{10}$ // granular-type recording layer(s) // protective overcoat: C The Ti adhesion layer and the Ta spacer layer between the pair of FeCoB soft magnetic underlayers were sputtered in an Ar atmosphere at about 6 mTorr pressure; the pair of FeCoB soft magnetic underlayers and the Ag interlayer were sputtered in an Ar atmosphere at about 2 mTorr pressure; the $RuCr_{10}$ interlayer was sputtered in an Ar atmosphere at about 12–35 mTorr pressure; and the granular-type recording layers were reactively sputtered in an $Ar/O_2$ atmosphere at a total pressure of about 30–40 mTorr. The target compositions for the recording layers were $CoPt_{18}$ and $CoCr_6Pt_{18}(SiO_2)_4$. Table II (below) presents the gas flows utilized for each data point in FIGS. 9 (A)-9 (B) and 10 (A)-10 (B). Table III (below) presents details of the process conditions for forming the $(CoPt_{18})O_x$ and $CoCr_6Pt_{18}(SiO_2)_4 O_x$ recording layers of the media of FIGS. 9 and 10, respectively.

Deposition of each layer of the media samples was performed at ambient temperature. In each case, the duration and total gas pressure of the inventive in situ post-deposition treatment with oxygen gas were about 3.5 sec. and about 20 mTorr, respectively. However, the in situ post-deposition treatment may be performed within intervals as short as about 2 sec. and at total gas pressures of about 10–13 mTorr to obtain consistent results. The % $O_2$ content in the $O_2/Ar$ gas mixture is controlled by use of MFC 1 and MFC 2

TABLE II

| % $O_2$ Content in $O_2/Ar$ | 0 | 1 | 2 | 3 | 4 | 5 |
|---|---|---|---|---|---|---|
| MFC 1: 100% Ar (sccm) | 0 | 32 | 24 | 16 | 8 | 0 |
| MFC 2: 5% $O_2$ in Ar (sccm) | 0 | 8 | 16 | 24 | 32 | 40 |

TABLE III

Figures 9A, 9B:
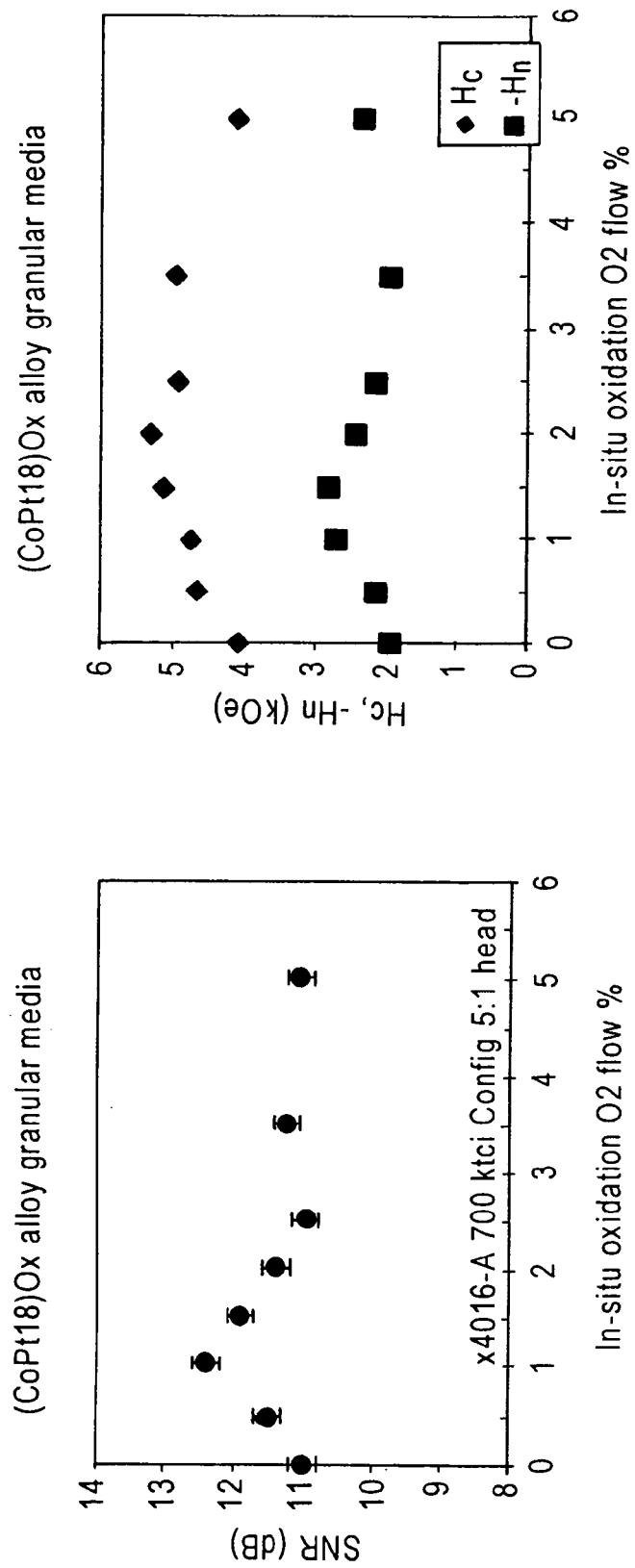
FIGS. 9 (A) and 9 (B), respectively, are graphs for illustrating the variation of signal-to-noise ratio (SNR) and coercivity ($H_c$)+nucleation field ($H_n$) of $(CoPt_{18})O_x$ granular-type perpendicular magnetic recording media as a function of % oxygen content during in situ post-deposition oxidation treatment of the magnetic recording layer according to a further embodiment the present invention.
Figure 10A:
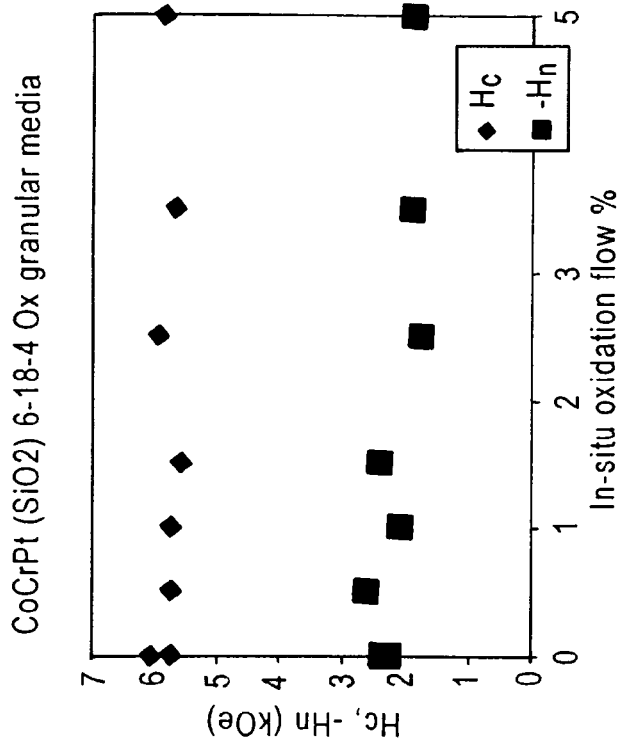
FIGS. 10 (A) and 10 (B), respectively, are graphs for illustrating the variation of signal-to-noise ratio (SNR) and coercivity ($H_c$)+nucleation field ($H_n$) of $CoCr_6Pt_{18}(SiO_2)_4 O_x$ granular-type perpendicular magnetic recording media as a function of % oxygen content during in situ post-deposition oxidation treatment of the magnetic recording layer according to a still further embodiment of the present invention.
Figure 10B:
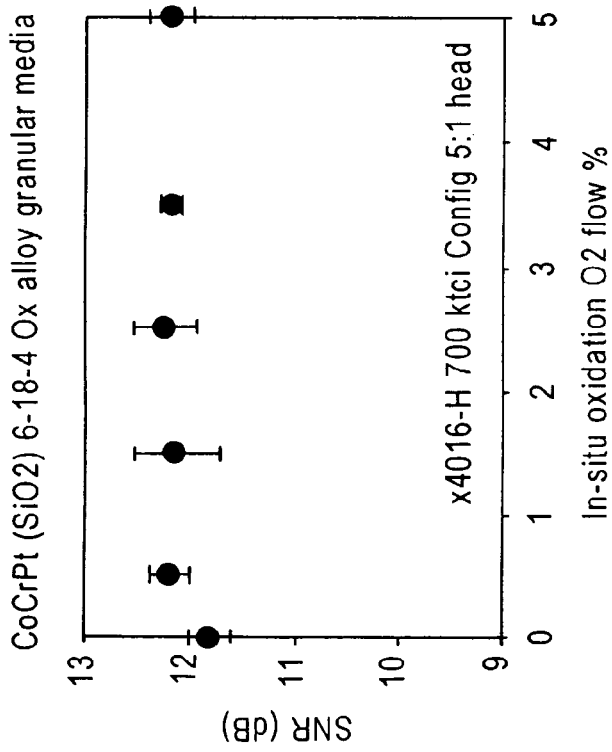

| | RuCr interlayer thickness | RuCr interlayer sputtering pressure | Granular layer comp. & thickness | Granular layer sputtering pressure |
|---|---|---|---|---|
| FIG. 9 | 16 nm | 12 mTorr | $(CoPt_{18})O_x$ 9 nm | 30 mTorr |
| FIG. 10 | 18 nm | 25 mTorr | $CoCr_6Pt_{18}(SiO_2)_4 O_x$ 10 nm | 38 mTorr |

FIGS. 9 (A)-9 (B) and 10 (A)-10 (B), respectively, graphically illustrate the variation of signal-to-noise ratio (SNR) and coercivity ($H_c$)+nucleation field ($H_n$) of $(CoPt_{18})O_x$ granular-type perpendicular magnetic recording media and $CoCr_6Pt_{18}(SiO_2)_4 O_x$ granular-type perpendicular magnetic recording media as a function of % oxygen content during in situ post-deposition oxidation treatment of the magnetic recording layer. As is apparent from FIGS. 9 (A)-9 (B), when the % $O_2$ content in the $O_2/Ar$ gas mixture was varied from 0 to about 5%, the SNR of the media with the $(CoPt_{18})O_x$ granular-type perpendicular magnetic recording layers improved by more than about 1 dB at an optimum % $O_2$ content of about 1%, and the values of $H_n$ were higher than with media samples which were not subjected to the inventive in situ post-deposition oxygen gas treatment of the magnetic recording layer. As for the $CoCr_6Pt_{18}(SiO_2)_4 O_x$ granular-type perpendicular magnetic recording media illustrated in FIGS. 10 (A)-10 (B), while the changes in SNR and magnetic properties are not as large as those exhibited by the $(CoPt_{18})O_x$ granular-type perpendicular magnetic recording media illustrated in FIGS. 9 (A)-9 (B), the inventive in situ post-deposition oxygen gas treatment of the magnetic recording layer nonetheless resulted in consistent improvement in the SNR.

In summary, higher negative nucleation fields ($-H_n$) and resultant improved thermal stability of magnetic recording media can be obtained by subjecting the magnetic recording layer, as deposited, to the inventive in situ post-deposition oxygen gas treatment, wherein the magnetic recording layer is exposed, at a sub-atmospheric pressure and for a relatively short interval, to a small amount of $O_2$ gas admixed with a larger amount of at least one inert carrier (diluent) gas, e.g., Ar and/or $N_2$ prior to formation of the protective overcoat layer thereon. The relatively short duration of the in situ post-deposition treatment process necessary for obtaining a desired improvement in the performance characteristics of the media is fully compatible with the product throughput (e.g., cycle) requirements of automated apparatus for industrial-scale manufacture of magnetic recording media, e.g., hard disks.

Finally, the inventive in situ post-deposition oxygen treatment technique can be utilized with any type of magnetic recording media, regardless of the materials used for the substrate, adhesion layer, soft magnetic underlayer(s), interlayer(s), and recording layer(s). The % $O_2$ content and process duration is preferably optimized according to the media design and the fabrication tool (e.g., post-treatment chamber) utilized for the treatment to obtain the maximum benefit of the inventive methodology.

In the previous description, numerous specific details are set forth, such as specific materials, structures, processes, etc., in order to provide a better understanding of the present invention. However, the present invention can be practiced without resorting to the details specifically set forth. In other instances, well-known processing materials and techniques have not been described in detail in order not to unnecessarily obscure the present invention.

Only the preferred embodiments of the present invention and but a few examples of its versatility are shown and described in the present disclosure. It is to be understood that the present invention is capable of use in various other combinations and environments and is susceptible of changes and/or modifications within the scope of the inventive concept as expressed herein.

What is claimed is:

1. A method of manufacturing a magnetic recording medium, comprising sequential steps of:
    (a) providing an apparatus for manufacturing said medium;
    (b) supplying said apparatus with a substrate for said medium;
    (c) forming a magnetic recording layer on said substrate in a first portion of said apparatus, wherein the magnetic recording layer is selected from the group consisting of:
        (1) a Co-based alloy, Cr-rich grain boundary magnetic layer comprising a CoCrPtX alloy, where X=at least one element selected from the group consisting of Ta, B, Mo, V, Nb, W, Zr, Re, Ru, Cu, Ag, Hf, Ir, and Y, and wherein Co-containing grains with hcp lattice structure are segregated by Cr-rich grain boundaries,
        (2) a granular magnetic layer comprising a CoPtX alloy, where X=at least one material selected from the group consisting of Cr, Ta, B, Mo, V, Nb, W, Zr, Re, Ru, Cu, Ag, Hf, Ir, Y, $SiO_2$, SiO, $Si_3N_4$, $Al_2O_3$, AlN, TiO, TiO$_2$, TiO$_x$, TiN, TiC, Ta$_2$O$_3$, NiO, and CoO, and wherein Co-containing grains with hcp lattice structure are segregated by oxide, nitride, or carbide grain boundaries, (3) a superlattice layer comprising a multi-layer (CoX/Pd)$_n$ or (CoX/Pt)$_n$ structure, where n is an integer from about 10 to about 25 and X is an element selected from the group consisting of Cr, Ta, B, Mo, Pt, W, and Fe, and (4) an L1$_0$ ferromagnetic metal alloy layer comprising a FePt or CoPt alloy;

(d) treating said magnetic recording layer, as deposited on said substrate in step (c), with oxygen gas in a second portion of said apparatus at a sub-atmospheric pressure and for an interval sufficient to provide the resultant medium with at least one of the following, relative to a similar medium manufactured by a similar method but wherein the oxygen treatment of step (d) is not performed:

(i) a more negative nucleation field (H$_n$);
(ii) increased remanent squareness (S$_r$);
(iii) increased signal-to-medium noise ratio (SMNR);
(iv) narrower switching field distribution (SFD); and
(v) decreased thermal decay rate; and (e) forming a protective overcoat layer on said oxygen-treated magnetic recording layer in a third portion of said apparatus.

2. The method according to claim 1, wherein:
step (a) comprises providing an apparatus including at least said first, second, and third spaced-apart portions.

3. The method according to claim 2, wherein:
step (a) comprises providing an apparatus adapted for continuous manufacture of a plurality of media and including means for transporting said substrate serially through said first, second, and third spaced-apart portions.

4. The method according to claim 3, wherein said first, second, and third spaced-apart, serially arranged portions of said apparatus respectively comprise first, second, and third spaced-apart chambers and at least said second chamber is adapted for providing a sub-atmospheric pressure therein.

5. The method according to claim 4, wherein said second chamber comprises means for flowing a mixture of oxygen gas diluted with an inert carrier gas past a surface of said magnetic recording layer formed on said substrate in step (c).

6. The method according to claim 4, wherein said first and third chambers of said apparatus are adapted for performing a thin film deposition process therein.

7. The method according to claim 6, wherein at least said first chamber of said apparatus is adapted for performing a sputtering process therein.

8. The method according to claim 1, wherein:
step (d) comprises treating said magnetic recording layer with a gas mixture comprising up to about 20% oxygen gas in at least one inert diluent gas, at a total gas pressure up to about 50 mTorr, and for an interval up to about 10 sec.

9. The method according to claim 8, wherein:
step (c) further comprises utilizing a heated substrate during formation of said magnetic recording layer to effect segregation of Cr in said grain boundaries.

10. The method according to claim 1, wherein:
step (d) comprises treating said magnetic recording layer with oxygen gas without applying heat thereto.

11. The method according to claim 1, wherein:
step (b) comprises supplying said apparatus with a disk-shaped substrate for a hard disk magnetic recording medium.

12. The method according to claim 1, wherein:
step (e) comprises forming a carbon-based protective overcoat layer on said oxygen-treated magnetic recording layer.

13. A method of manufacturing magnetic recording media according to a continuous process, comprising sequential steps of:

(a) providing at least one substrate for said magnetic recording media;

(b) providing an apparatus adapted for continuous manufacturing of said magnetic recording media, comprising at least first, second, and third spaced-apart, serially arranged processing chambers and including means for transporting said at least one substrate serially through at least said first, second, and third spaced-apart processing chambers;

(c) transporting said substrate through said first processing chamber while forming a magnetic recording layer thereon;

(d) transporting said substrate with said magnetic recording layer formed thereon to said second processing chamber;

(e) transporting said substrate through said second processing chamber while treating said magnetic recording layer with oxygen gas at a sub-atmospheric pressure and for an interval sufficient to provide the resultant media with at least one of the following, relative to similar media manufactured by a similar method but wherein the oxygen treatment of step (e) is not performed:

(i) a more negative nucleation field (H$_n$);
(ii) increased remanent squareness (S$_r$);
(iii) increased signal-to-medium noise ratio (SMNR);
(iv) narrower switching field distribution (SFD); and
(v) decreased thermal decay rate;

(f) transporting said substrate with said oxygen-treated magnetic recording layer formed thereon to said third processing chamber; and (g) transporting said substrate through said third processing chamber while forming a protective overcoat layer on said oxygen-treated magnetic recording layer; wherein:

said substrate is transported between and through each of said first, second, and third processing chambers at a substantially constant rate.

14. The method according to claim 13, wherein:
step (a) comprises providing at least one disk-shaped substrate for hard disk magnetic recording media;
step (b) comprises providing an apparatus wherein said first and third chambers are adapted for performing a thin film deposition process therein and at least said second chamber is adapted for providing a sub-atmospheric pressure therein; and
step (c) comprises forming a magnetic recording layer selected from the group consisting of: (1) a Co-based alloy, Cr-rich grain boundary magnetic layer; (2) a granular magnetic layer; (3) a superlattice layer; and (4) an L1$_0$ ferromagnetic metal alloy layer.

15. A method of manufacturing a magnetic recording medium, comprising sequential steps of:

(a) providing an apparatus for manufacturing said medium;

(b) supplying said apparatus with a substrate for said medium;
(c) forming a magnetic recording layer on said substrate in a first portion of said apparatus;
(d) treating said magnetic recording layer, as deposited on said substrate in step (c), with oxygen gas in a second portion of said apparatus at a sub-atmospheric pressure; and
(e) forming a protective overcoat layer on said oxygen-treated magnetic recording layer in a third portion of said apparatus, wherein:
said substrate is transported between and through each of said first, second, and third portions at a substantially constant rate.

* * * * *